(12) United States Patent
Weaver

(10) Patent No.: US 12,092,214 B1
(45) Date of Patent: Sep. 17, 2024

(54) ADJUSTABLE MOUNTING ASSEMBLY FOR TENSION MEMBER DRIVEN DEVICE

(71) Applicant: Pratt & Whitney Canada Corp., Longueuil (CA)

(72) Inventor: Paul Weaver, Chateauguay (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/196,679

(22) Filed: May 12, 2023

(51) Int. Cl.
*F16H 7/14* (2006.01)
*B64D 27/10* (2006.01)

(52) U.S. Cl.
CPC .............. *F16H 7/14* (2013.01); *B64D 27/10* (2013.01)

(58) Field of Classification Search
CPC .................................. F16H 7/14; B64D 27/10
See application file for complete search history.

(56) References Cited

U.S. PATENT DOCUMENTS

| 4,399,665 | A | | 8/1983 | Evans | |
|---|---|---|---|---|---|
| 4,506,522 | A | * | 3/1985 | Swaney | F04B 39/14 123/195 A |
| 4,618,336 | A | * | 10/1986 | Isobe | F16H 7/14 474/133 |
| 5,269,662 | A | * | 12/1993 | Denton | F04B 35/00 417/362 |
| 6,638,191 | B1 | * | 10/2003 | Hankins | F16H 7/14 474/134 |
| 7,886,544 | B2 | | 2/2011 | Koenig | |
| 8,336,814 | B2 | | 12/2012 | Reinhardt | |
| 8,974,332 | B2 | * | 3/2015 | Hood | F16H 7/1263 474/113 |
| 10,174,817 | B2 | * | 1/2019 | Cederstrand | F16H 7/0848 |
| 10,487,839 | B2 | | 11/2019 | Kupiszewski | |
| 10,494,117 | B2 | | 12/2019 | Bosma | |
| 10,882,634 | B2 | | 1/2021 | Bosma | |
| 11,679,892 | B2 | * | 6/2023 | Lowental | B64D 27/24 290/46 |
| 2003/0176250 | A1 | * | 9/2003 | Austin | F02B 67/06 474/134 |
| 2020/0040970 | A1 | * | 2/2020 | Lamphere | F16H 7/14 |

(Continued)

FOREIGN PATENT DOCUMENTS

| CN | 204349701 U | 5/2015 |
|---|---|---|
| CN | 209494633 U | 10/2019 |
| CN | 112049909 A | 12/2020 |

(Continued)

*Primary Examiner* — Jesse S Bogue
(74) *Attorney, Agent, or Firm* — Getz Balich LLC

(57) ABSTRACT

An assembly is provided for an aircraft propulsion system. This assembly includes a housing, a rotor and a system. The rotor is next to the housing. The system includes a mechanical load, a belt drive, a cradle, a slide and an adjustment link. The mechanical load is operatively coupled to the rotor through the belt drive. The mechanical load is fixed to the cradle. The cradle includes a track and extends laterally between a first side and a second side. The cradle is coupled to the housing through the adjustment link at the first side. The cradle is pivotally coupled to the housing at the second side. The slide is connected to the housing. The slide is mated with and configured to move along the track. The adjustment link is configured to change a distance between the housing and the cradle to adjust a tension of the belt drive.

20 Claims, 6 Drawing Sheets

(56) References Cited

U.S. PATENT DOCUMENTS

2021/0147093 A1  5/2021  Bosma
2022/0348342 A1  11/2022  Lowental

FOREIGN PATENT DOCUMENTS

GB   2592977 B    3/2023
WO   2006084437 A1  8/2006
WO   2010067172 A2  6/2010

* cited by examiner

ADJUSTABLE MOUNTING ASSEMBLY FOR TENSION MEMBER DRIVEN DEVICE

TECHNICAL FIELD

This disclosure relates generally to an aircraft propulsion system and, more particularly, to mounting a tension member driven component to a gas turbine engine structure.

BACKGROUND INFORMATION

An aircraft propulsion system may include various components mounted to an exterior of a gas turbine engine. An electric generator, for example, may be mounted to a case of the gas turbine engine. This electric generator may be driven by a propeller rotor through a belt drive with a tensioning device. Arrangements are known in the art for coupling a component such as an electric generator to a rotor such as a propeller rotor. While these known arrangements have various benefits, there is still room in the art for improvement.

SUMMARY

According to an aspect of the present disclosure, an assembly is provided for an aircraft propulsion system. This assembly includes a housing, a rotor and a system. The rotor is next to the housing. The system includes a mechanical load, a belt drive, a cradle, a slide and an adjustment link. The mechanical load is operatively coupled to the rotor through the belt drive. The mechanical load is fixed to the cradle. The cradle includes a track and extends laterally between a first side and a second side. The cradle is coupled to the housing through the adjustment link at the first side. The cradle is pivotally coupled to the housing at the second side. The slide is connected to the housing. The slide is mated with and configured to move along the track. The adjustment link is configured to change a distance between the housing and the cradle to adjust a tension of the belt drive.

According to another aspect of the present disclosure, another assembly is provided for an aircraft propulsion system. This assembly includes a housing, a rotor and a system. The rotor is next to the housing. The system includes a mechanical load, a belt drive, a cradle, a first bracket, a second bracket and an adjustment link. The mechanical load is operatively coupled to the rotor through the belt drive. The mechanical load is supported by and fixed to the cradle. The cradle extends longitudinally between a first end and a second end. The cradle extends laterally between a first side and a second side. The cradle is coupled to the housing through the adjustment link at the first side. The cradle is pivotally coupled to the first bracket and the second bracket at the second side. The first bracket is disposed next to the first end and fixed to the housing independent of the second bracket. The second bracket is disposed next to the second end and fixed to the housing independent of the first bracket. The adjustment link is configured to change a distance between the housing and the cradle to adjust a tension of the belt drive.

According to still another aspect of the present disclosure, another assembly is provided for an aircraft propulsion system. This assembly includes a housing, a rotor and a system. The rotor is next to the housing. The system includes a mechanical load, a belt drive, a cradle, a bracket and an adjustment link. The mechanical load is operatively coupled to the rotor through the belt drive. The mechanical load is supported by and fixed to the cradle. The cradle extends laterally between a first side and a second side. The cradle is pivotally coupled to the bracket at the second side. The bracket is fixed to the housing independent of the adjustment link. The adjustment link is configured to change a distance between the housing and the cradle to adjust a tension of the belt drive. A first end of the adjustment link is pivotally mounted to the cradle. A second end of the adjustment link is pivotally mounted to the housing.

The first bracket may be bolted to a first mount of the housing. The second bracket may be bolted to a second mount of the housing.

The cradle may be disposed longitudinally between the first bracket and the second bracket.

The system may also include a first fastener and a second fastener. The cradle may include a first slot and a second slot. The first fastener may project through the first slot and may be configured to fix the cradle to the first bracket at the first side when the first fastener is tightened. The second fastener may project through the second slot and may be configured to fix the cradle to the second bracket at the first side when the second fastener is tightened.

The rotor may be configured as or otherwise include a propeller rotor.

The mechanical load may be configured as or otherwise include a generator.

The rotor may be a first rotor. The mechanical load may include a second rotor. The first rotor may be configured to drive rotation of the second rotor through the belt drive.

The system may also include a gearbox operatively coupled between the belt drive and the mechanical load. The gearbox may be fixed to the cradle.

The belt drive may include a first pulley, a second pulley and a belt. The first pulley may be mounted to the rotor. The second pulley may be operatively coupled to the mechanical load. The belt may be wrapped around and contact the first pulley and the second pulley.

The adjustment link may include a turnbuckle.

The adjustment link may be pivotally mounted to the housing. The adjustment link may be pivotally mounted to the cradle.

The track may be configured as or otherwise include a slot in the cradle. The slide may be configured as or otherwise include a fastener projecting through the slot. The fastener may be configured to tighten against the cradle to fix a position of the cradle relative to the housing.

The track may be a first track. The cradle may also include a second track. The slide may be a first slide. The system may also include a second slide connected to the housing. The second slide may be mated with and configured to move along the second track.

The system may also include a first bracket and a second bracket. The first bracket may be fixed to the housing. The cradle may be pivotally coupled to the first bracket at the second side. The first slide may be connected to the first bracket. The second bracket may be discrete from the first bracket and fixed to the housing. The cradle may be pivotally coupled to the second bracket at the second side. The second slide may be connected to the second bracket.

The system may also include a bracket mechanically fastened to a flange of the housing. The cradle may be pivotally coupled to the bracket at the second side. The slide may be supported by the bracket.

The system may also include a support mechanically fastened to the cradle. The mechanical load may be mechanically fastened to the support.

The assembly may also include an engine core configured to drive rotation of the rotor. The engine core may include a compressor section, a combustor section, a turbine section and a flowpath extending sequentially through the compressor section, the combustor section and the turbine section.

The assembly may also include a geartrain operatively coupling the engine core to the rotor. The geartrain may be housed within the housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
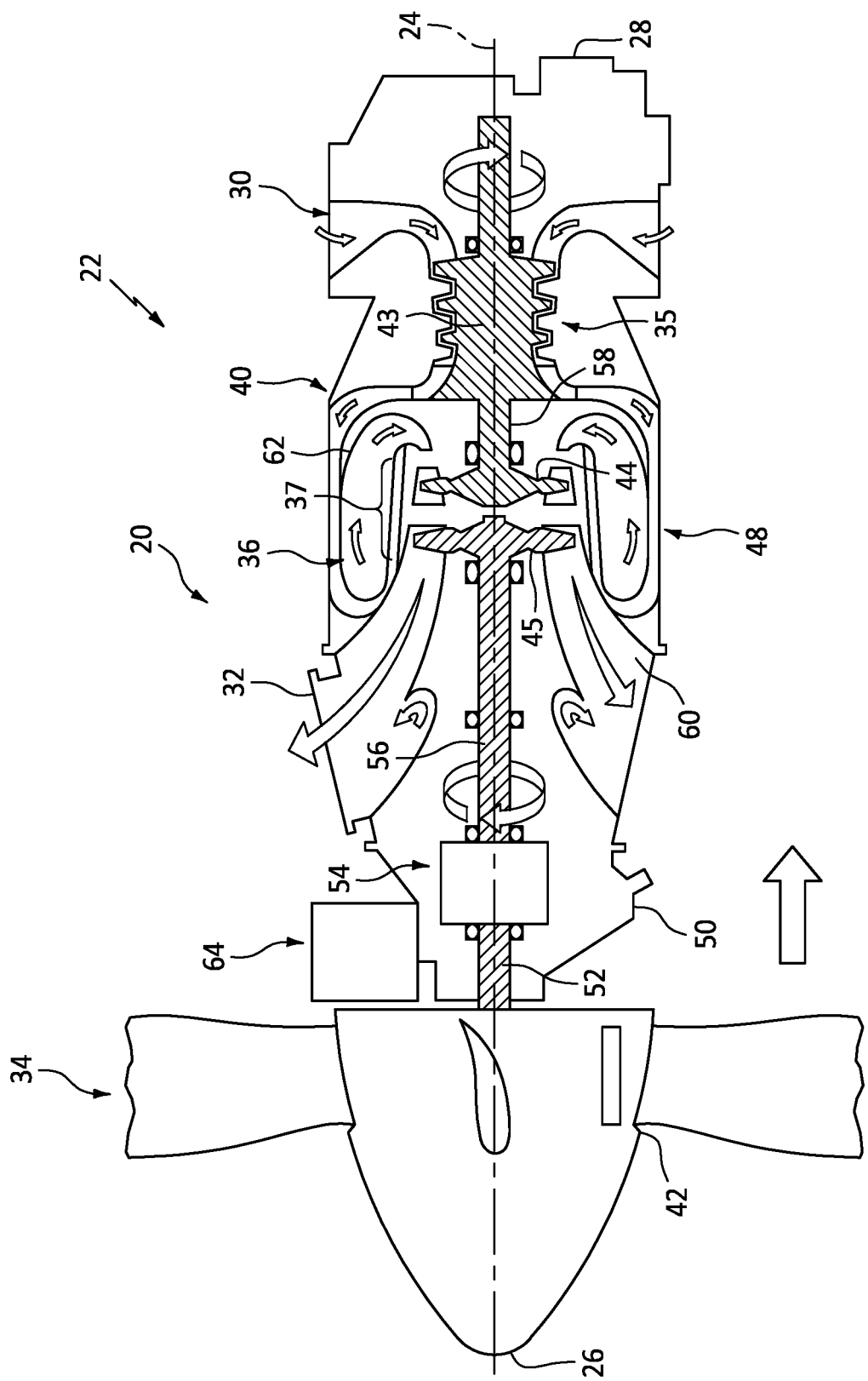
FIG. 1 is a partial schematic illustration of a propulsion system for an aircraft.

FIG. 1 illustrates a gas turbine engine 20 of an aircraft propulsion system 22. The gas turbine engine 20 of FIG. 1 is configured as a turboprop engine. The gas turbine engine 20 extends axially along a centerline axis 24 between a forward end 26 of the gas turbine engine 20 and an aft end 28 of the gas turbine engine 20. The gas turbine engine 20 of FIG. 1 includes an airflow inlet 30, a combustion products exhaust 32, a propulsor (e.g., a propeller) section 34, a compressor section 35, a combustor section 36 and a turbine section 37.

The airflow inlet 30 is located towards the engine aft end 28, and aft of the compressor section 35. The exhaust 32 is located towards the engine forward end 26, and axially between the propulsor section 34 and a core 40 of the gas turbine engine 20. Here, the engine core 40 includes the compressor section 35, the combustor section 36 and the turbine section 37. This engine core 40 is configured to power operation of the propulsor section 34 as described below in further detail.

The propulsor section 34 includes a propulsor rotor 42; e.g., a propeller. The compressor section 35 includes a compressor rotor 43. The turbine section 37 includes a high pressure turbine (HPT) rotor 44 and a low pressure turbine (LPT) rotor 45, where the LPT rotor 45 may be referred to as a power turbine rotor. Each of these bladed engine rotors 43-45 includes a plurality of rotor blades arranged circumferentially about and connected to one or more respective rotor disks or hubs. The rotor blades, for example, may be formed integral with or mechanically fastened, welded, brazed, adhered and/or otherwise attached to the respective rotor disk(s) or hub(s).

The engine sections 35-37 and their respective bladed rotors 43-45 are housed within an engine housing 48. This engine housing 48 includes an engine case 50 which extends axially along and circumscribes the engine core 40 and its engine sections 35-37. The engine case 50 may be a segmented structure. The engine case 50, for example, may include a plurality of discrete (e.g., axial and/or circumferential) case segments mechanically fastened and interconnected together. The engine housing 48 and its engine case 50 may be arranged axially next to the propulsor rotor 42. The propulsor rotor 42 of FIG. 1, for example, is disposed outside of and axially forward of the engine housing 48 and its engine case 50.

The propulsor rotor 42 is operatively coupled to the LPT rotor 45. The propulsor rotor 42 of FIG. 1, for example, is connected to the LPT rotor 45 sequentially through a propulsor shaft 52, a geartrain 54 (e.g., an epicyclic geartrain, a transmission, etc.) and a low speed shaft 56. The compressor rotor 43 is operatively coupled to the HPT rotor 44. The compressor rotor 43 of FIG. 1, for example, is connected to the HPT rotor 44 through a high speed shaft 58. Here, at least the engine components 54, 56 and 58 of FIG. 1 are also housed within the engine housing 48 and its engine case 50.

During operation of the aircraft propulsion system 22, air enters the gas turbine engine 20 through the airflow inlet 30. This air is directed into a core flowpath 60 which extends sequentially from the airflow inlet 30, through the engine sections 35, 36 and 37, to the exhaust 32. The air entering the core flowpath 60 may be referred to as "core air". This core air is compressed by the compressor rotor 43 and directed into a combustion chamber of a combustor 62 in the combustor section 36. Fuel is injected into the combustion chamber and mixed with the compressed core air to provide a fuel-air mixture. This fuel-air mixture is ignited and combustion products thereof flow through and sequentially cause the HPT rotor 44 and the LPT rotor 45 to rotate. The rotation of the HPT rotor 44 drives rotation of the compressor rotor 43 and, thus, compression of air received from the airflow inlet 30. The rotation of the LPT rotor 45 drives rotation of the propulsor rotor 42. The rotation of the propulsor rotor 42 propels air outside of and axially along the gas turbine engine 20 and its engine housing 48 in an aft direction to provide forward aircraft thrust.

Figure 2:
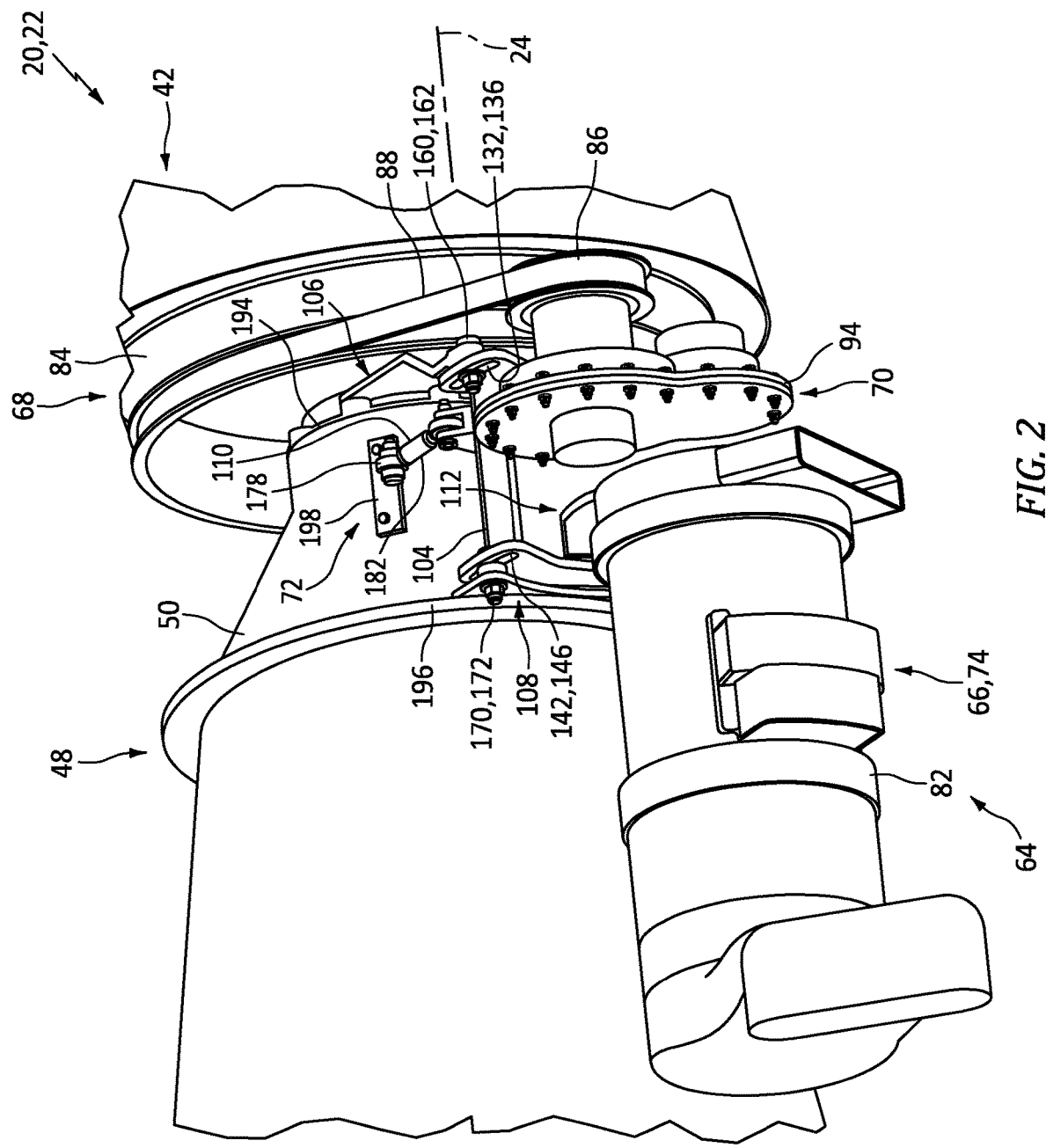
FIG. 2 is a partial perspective illustration of the propulsion system at an engine assembly.

The aircraft propulsion system 22 of FIG. 1 also includes an auxiliary engine system 64; e.g., an engine accessory system. Referring to FIG. 2, the engine system 64 includes a mechanical load 66, a belt drive 68, a gearbox 70 and a mounting assembly 72.

The mechanical load 66 may be an accessory for propulsion system and/or aircraft operation. The mechanical load 66 of FIG. 3, for example, is configured as an electric generator 74. This electric generator 74 is configured to convert mechanical power into electricity. This electricity may be utilized for various purposes within the aircraft propulsion system 22 (see FIGS. 1 and 2) and/or the aircraft more generally. The electricity, for example, may be provided to a component 76 for electrically powering operation of that component 76. The component 76, for example, may be an actuator, a controller, a pump, a motor or any other electrically powered device. Alternatively, the electricity may be provided to the component 76 for charging that component 76. The component 76, for example, may be a power storage device such as a battery or a battery bank. While FIG. 2 is shown with a single component electrically coupled to the electric generator 74, it is contemplated that multiple of such a component or various different components may be electrically coupled to the electric generator 74.

The electric generator 74 includes a generator rotor 78 and a generator stator 80. The electric generator 74 also includes a generator case 82 that at least partially or completely houses and supports the generator rotor 78 and the generator stator 80 within an internal volume; e.g., cavity, chamber, etc. This electric generator 74 may be configured as a radial flux generator where the generator stator 80 is radially outboard of and circumscribes the generator rotor 78. The present disclosure, however, is not limited to such an exemplary arrangement. The generator rotor 78, for example, may alternatively be radially outboard of and circumscribe the generator stator 80. In another example, the electric generator 74 may be configured as an axial flux generator where the generator rotor 78 is axially next to the generator stator 80. Moreover, the mechanical load 66 of the present disclosure is not limited to the foregoing exemplary configuration. The mechanical load 66, for example, may alternatively be configured as an air conditioning (A/C) compressor, a hydraulic pump or a fluid pump (e.g., for an agricultural sprayer).

The belt drive 68 is configured to operatively couple the propulsor rotor 42 to the gearbox 70 and, thus, the mechanical load 66. This belt drive 68 may be a two-pulley system. The belt drive 68 of FIG. 3, for example, includes a drive pulley 84, a driven pulley 86 and a tension member 88 such as a belt. The drive pulley 84 is mounted (e.g., bolted and/or otherwise mechanically fastened) to and rotatable with the propulsor rotor 42, for example at (e.g., on, adjacent or proximate) an aft end of the propulsor rotor 42. The driven pulley 86 is mounted to and rotatable with an input shaft 90 of (or another input to) the gearbox 70. The driven pulley 86 of FIG. 3 has a smaller diameter than the drive pulley 84; however, the present disclosure is not limited to such an exemplary arrangement. The tension member 88 is wrapped around and contacts and grips a contact region on an outer periphery of the drive pulley 84 as well as a contact region on an outer periphery of the driven pulley 86. With such an arrangement, the tension member 88 (when tensioned) is configured to transfer mechanical power from the drive pulley 84 to the driven pulley 86. Rotation of the drive pulley 84 may thereby drive rotation of the driven pulley 86 through rotation of the tension member 88.

The gearbox 70 is configured to operatively coupled the belt drive 68 to the mechanical load 66. This gearbox 70 may also be configured as a speed change device such as a speed multiplying device. The gearbox 70 of FIG. 3, for example, includes the input shaft 90, an output shaft 92 (or another output), a gearbox case 94 and a geartrain 96 housed and supported within the gearbox case 94. The geartrain 96 of FIG. 3 includes a drive gear 98 and a driven gear 100. The drive gear 98 is mounted to and rotatable with the input shaft 90. The driven gear 100 is mounted to and rotatable with the output shaft 92. The driven gear 100 of FIG. 3 has a smaller diameter than the drive gear 98; however, the present disclosure is not limited to such an exemplary arrangement. One or more teeth of the driven gear 100 are meshed with one or more teeth of the drive gear 98. With such an arrangement, the geartrain 96 and its gears 98 and 100 are configured to transfer mechanical power from the input shaft 90 to the output shaft 92. Rotation of the input shaft 90 may thereby drive rotation of the output shaft 92 through the geartrain 96 and rotation of its gears 98 and 100.

Figure 3:
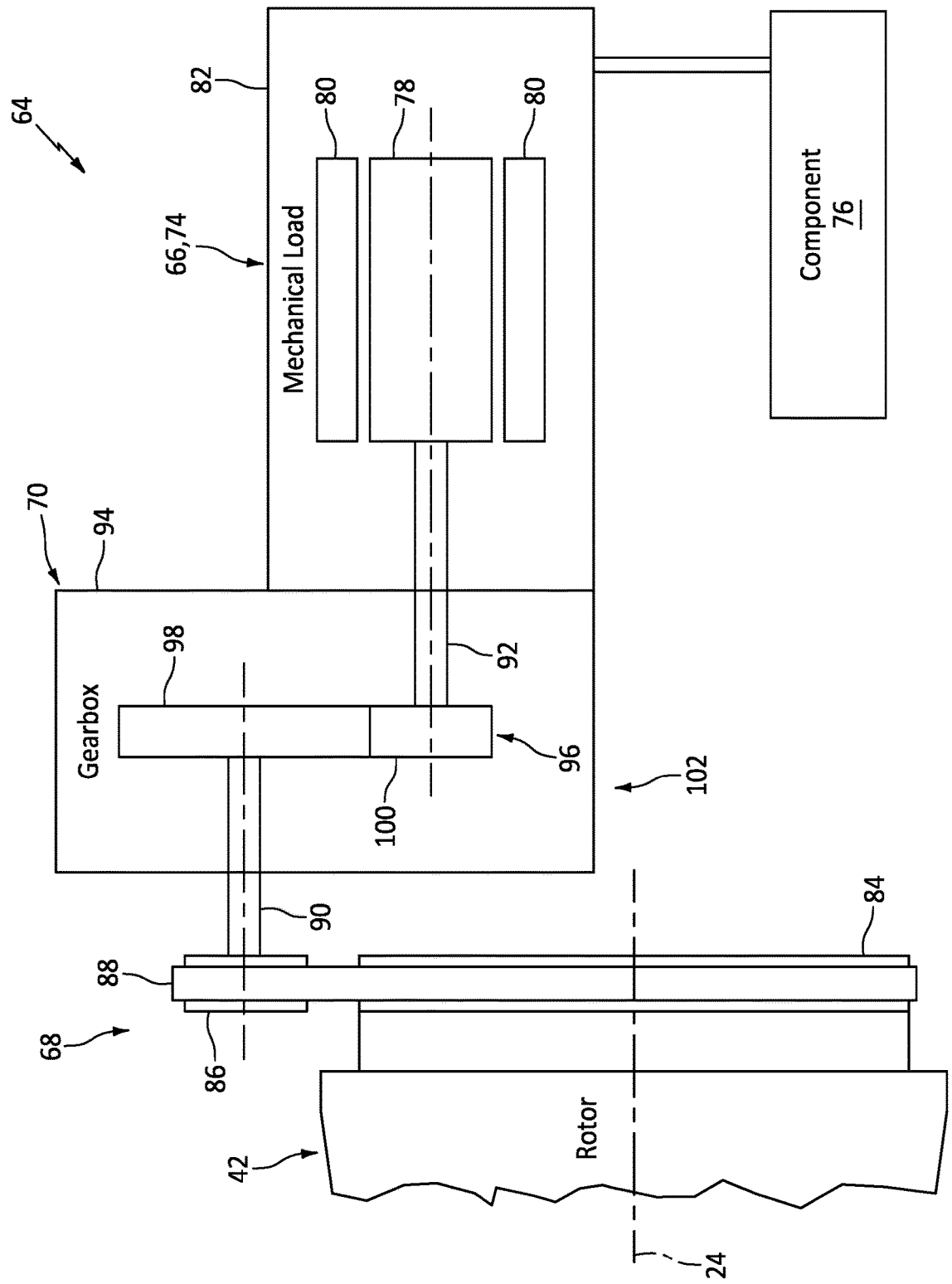
FIG. 3 is a schematic illustration of the engine assembly operatively coupled to a rotor of a gas turbine engine.

The output shaft 92 of FIG. 3 is coupled to the generator rotor 78 (e.g., a driven rotor of the mechanical load 66). With this arrangement, at least (or only) the belt drive 68 and the gearbox 70 form a drivetrain 102 between the propulsor rotor 42 and the electric generator 74 and its generator rotor 78. This drivetrain 102 is configured to transfer mechanical power from the propulsor rotor 42 (which is imparted by the engine core 40 of FIG. 1 and its LPT rotor 45) to the generator rotor 78. The propulsor rotor 42 may thereby drive rotation of the generator rotor 78/power operation of the electric generator 74 through the drivetrain 102.

Figure 4:
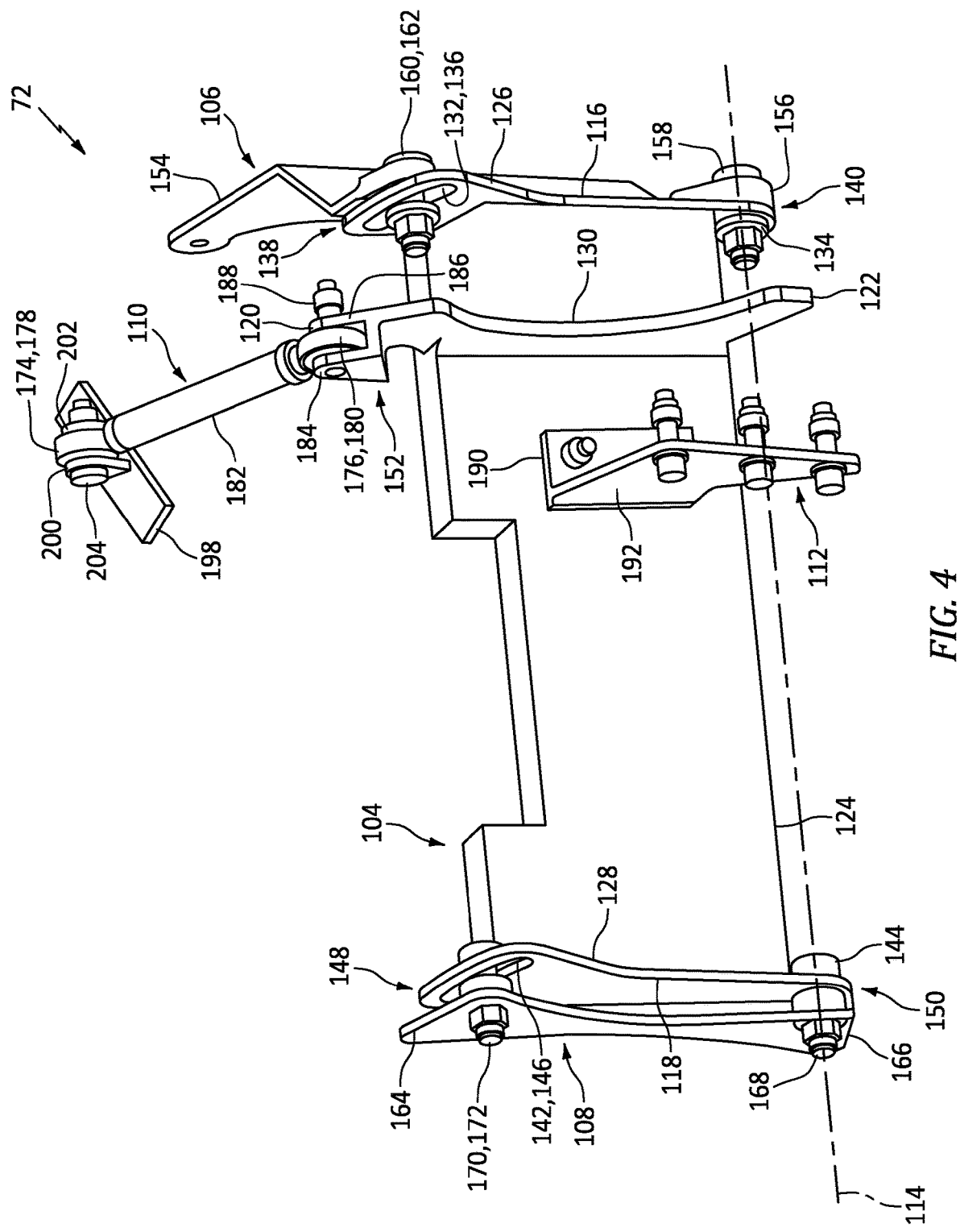
FIG. 4 is a perspective illustration of a mounting assembly.

Referring to FIG. 2, the mounting assembly 72 is configured to mount the mechanical load 66 and the gearbox 70 to the engine housing 48 and its engine case 50. The mounting assembly 72 of FIG. 2 is also configured to adjust a tension of the tension member 88 of the belt drive 68 to facilitate (e.g., optimum, efficient, etc.) power transfer between the propulsor rotor 42 and the input shaft 90 (see FIG. 3) through the belt drive 68. Referring to FIG. 4, the mounting assembly 72 includes a support cradle 104, a forward mounting bracket 106, an aft mounting bracket 108 and a cradle adjustment link 110. The mounting assembly 72 of FIG. 4 also includes an intermediate support 112 such as a bracket, a stiffener, etc.

The support cradle 104 extends longitudinally along a longitudinal pivot axis 114 between and to a longitudinal forward end 116 of the support cradle 104 and a longitudinal aft end 118 of the support cradle 104. The support cradle 104 extends laterally (e.g., perpendicular to the pivot axis 114) between and to lateral first side 120 of the support cradle 104 and a lateral second side 122 of the support cradle 104. The support cradle 104 of FIG. 4 includes a cradle base 124, a forward cradle mount 126, an aft cradle mount 128 and an intermediate cradle mount 130.

The cradle base 124 may be configured as a structured plate. This cradle base 124 may provide a structural backbone for the support cradle 104. The cradle base 124 of FIG. 4 extends longitudinally between and to the forward cradle mount 126 and the aft cradle mount 128.

The forward cradle mount 126 is connected to (e.g., formed integral with or bonded to) the cradle base 124 at the cradle forward end 116. The forward cradle mount 126 may be configured as a flange which forms the cradle forward end 116. The forward cradle mount 126 of FIG. 4 includes a forward track 132 and a forward mounting aperture 134; e.g., a circular through hole. The forward track 132 may be arranged at a corner between the cradle forward end 116 and the cradle first side 120. The forward track 132 of FIG. 4 is configured as an arcuate slot 136. This forward mount slot 136 extends longitudinally through the forward cradle mount 126. The forward mount slot 136 extends within the forward cradle mount 126 along an arcuate centerline (a major axis centerline) of that slot 136, which arcuate centerline extends circumferentially about (e.g., curved about) the pivot axis 114. The forward mount slot 136 of FIG. 4 is formed in a (e.g., unsupported, cantilevered) first portion 138 of the forward cradle mount 126 that projects laterally out from the cradle base 124 toward (or to) the cradle first side 120. The forward mounting aperture 134 may be arranged at a corner between the cradle forward end 116 and the cradle second side 122. This forward mounting aperture 134 extends longitudinally through the forward cradle mount 126 and is coaxial with the pivot axis 114. The forward mounting aperture 134 of FIG. 4 is formed in a (e.g., unsupported, cantilevered) second portion 140 of the forward cradle mount 126 that projects laterally out from the cradle base 124 toward (or to) the cradle second side 122.

The aft cradle mount 128 is connected to (e.g., formed integral with or bonded to) the cradle base 124 at the cradle aft end 118. The aft cradle mount 128 may be configured as a flange which forms the cradle aft end 118. The aft cradle mount 128 of FIG. 4 includes an aft track 142 and an aft mounting aperture 144; e.g., a circular through hole. The aft track 142 may be arranged at a corner between the cradle aft end 118 and the cradle first side 120. The aft track 142 of FIG. 4 is configured as an arcuate slot 146. This aft mount slot 146 extends longitudinally through the aft cradle mount 128. The aft mount slot 146 extends within the aft cradle mount 128 along an arcuate centerline (a major axis centerline) of that slot 146, which arcuate centerline extends circumferentially about (e.g., curved about) the pivot axis 114. The aft mount slot 146 of FIG. 4 is formed in a (e.g., unsupported, cantilevered) first portion 148 of the aft cradle mount 128 that projects laterally out from the cradle base 124 toward (or to) the cradle first side 120. The aft mounting aperture 144 may be arranged at a corner between the cradle aft end 118 and the cradle second side 122. This aft mounting aperture 144 extends longitudinally through the aft cradle mount 128 and is coaxial with the pivot axis 114 and the forward mounting aperture 134. The aft mounting aperture 144 of FIG. 4 is formed in a (e.g., unsupported, cantilevered) second portion 150 of the aft cradle mount 128 that projects laterally out from the cradle base 124 toward (or to) the cradle second side 122.

The intermediate cradle mount 130 is arranged longitudinally between and spaced from the forward cradle mount 126 and the aft cradle mount 128. The intermediate cradle mount 130 may be disposed longitudinally closer to the forward cradle mount 126 than the aft cradle mount 128 along the pivot axis 114. The intermediate cradle mount 130 is connected to (e.g., formed integral with or bonded to) the cradle base 124. The intermediate cradle mount 130 of FIG. 4 includes a clevis 152 at the cradle first side 120. This clevis 152 may be formed by a (e.g., unsupported, cantilevered) first portion of the intermediate cradle mount 130 that projects laterally out from the cradle base 124 to the cradle first side 120.

The forward mounting bracket 106 may be configured as a mounting plate or flange. The forward mounting bracket 106 extends laterally between and to a lateral first side 154 of the forward mounting bracket 106 and a lateral second side 156 of the forward mounting bracket 106. The forward mounting bracket 106 includes a first mounting aperture and a second mounting aperture, where each aperture may be a circular through hole. The first mounting aperture is disposed at the forward bracket first side 154. The second mounting aperture is disposed at the forward bracket second side 156.

The forward mounting bracket 106 is coupled to the support cradle 104 at the cradle forward end 116. In particular, the support cradle 104 and its forward mount second portion 140 are pivotally coupled (e.g., pinned) to the forward mounting bracket 106. A fastener 158 (e.g., a bolt, a bolt and nut, a pin, etc.), for example, may be mated with (e.g., extend through) the forward mounting aperture 134 and the forward bracket first mounting aperture. The support cradle 104 and its forward mount first portion 138 are also coupled to the forward mounting bracket 106. Another fastener 160 (e.g., a bolt, a bolt and nut, a pin, etc.), for example, may be mated with (e.g., extend through) the forward mount slot 136 and the forward bracket second mounting aperture. When this fastener 160 is loose, the fastener 160 is operable to move (e.g., translate, slide) along the forward mount slot 136. The fastener 160 may thereby form a slide 162 for the forward track 132. However, when the fastener 160 is tightened, the fastener 160 may fix a position of the support cradle 104 relative to the forward mounting bracket 106. It is contemplated the fastener 158 may also be tightened to further fix the position of the support cradle 104.

The aft mounting bracket 108 may be configured as a mounting plate or flange. The aft mounting bracket 108 extends laterally between and to a lateral first side 164 of the aft mounting bracket 108 and a lateral second side 166 of the aft mounting bracket 108. The aft mounting bracket 108 includes a first mounting aperture and a second mounting aperture, where each aperture may be a circular through hole. The first mounting aperture is disposed at the aft bracket first side 164. The second mounting aperture is disposed at the aft bracket second side 166.

The aft mounting bracket 108 is coupled to the support cradle 104 at the cradle aft end 118. In particular, the support cradle 104 and its aft mount second portion 150 are pivotally coupled (e.g., pinned) to the aft mounting bracket 108. A fastener 168 (e.g., a bolt, a bolt and nut, a pin, etc.), for example, may be mated with (e.g., extend through) the aft mounting aperture 144 and the aft bracket first mounting aperture. The support cradle 104 and its aft mount first portion 148 are also coupled to the aft mounting bracket 108. Another fastener 170 (e.g., a bolt, a bolt and nut, a pin, etc.), for example, may be mated with (e.g., extend through) the aft mount slot 146 and the aft bracket second mounting aperture. When this fastener 170 is loose, the fastener 170 is operable to move (e.g., translate, slide) along the aft mount slot 146. The fastener 170 may thereby form a slide 172 for the aft track 142. However, when the fastener 170 is tightened, the fastener may fix the position of the support cradle 104 relative to the aft mounting bracket 108. It is contemplated the fastener 168 may also be tightened to further fix the position of the support cradle 104.

The adjustment link 110 extends between and to a first end 174 of the adjustment link 110 and a second end 176 of the adjustment link 110. The adjustment link 110 has a variable length between the link first end 174 and the link second end 176. The adjustment link 110 may be configured as an eye-to-eye turnbuckle. This adjustment link 110 of FIG. 4, for example, includes a first turnbuckle eye 178, a second turnbuckle eye 180 and a turnbuckle body 182. The first turnbuckle eye 178 is disposed at the link first end 174, and the first turnbuckle eye 178 is threaded into a first end of the turnbuckle body 182. The second turnbuckle eye 180 is disposed at the link second end 176, and the second turnbuckle eye 180 is threaded into a second end of the turnbuckle body 182. This second turnbuckle eye 180 is pivotally coupled to the intermediate cradle mount 130 and its intermediate mount first portion. The second turnbuckle eye 180, for example, is disposed between forks 184 and 186 (e.g., flanged, tabs, etc.) of the clevis 152. A fastener 188 (e.g., a bolt, a bolt and nut, a pin, etc.) projects sequentially through the first fork 184, the second turnbuckle eye 180 and the second fork 186.

The intermediate support 112 may have an L-shaped geometry. The intermediate support 112 of FIG. 4, for example, includes a support base 190 and a support arm 192 projecting out from and angularly offset from (e.g., perpendicular to) the support base 190. The intermediate support 112 and its support base 190 are mechanically fastened (e.g., bolted) or otherwise attached to the support cradle 104 and its cradle base 124. The intermediate support 112 of FIG. 4 is disposed longitudinally between the aft cradle mount 128 and the intermediate cradle mount 130. The intermediate cradle mount 130 is disposed longitudinally between the intermediate support 112 and the forward cradle mount 126. The intermediate support 112 may be disposed longitudinally closer to the forward cradle mount 126 than the aft cradle mount 128 along the pivot axis 114.

Figure 5:
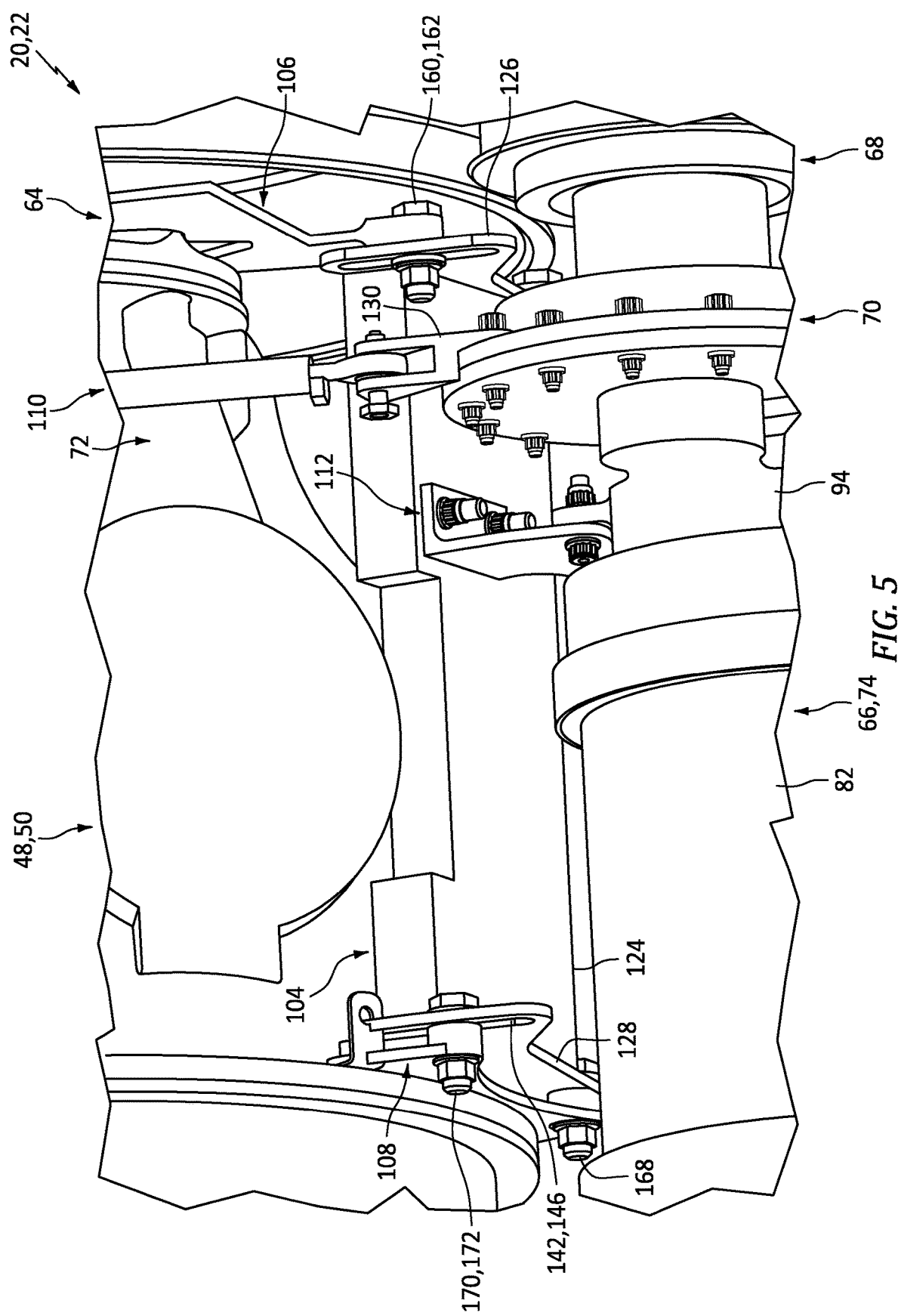
FIGS. 5 and 6 are partial perspective illustrations of the mounting assembly mounting the engine assembly to the gas turbine engine.
Figure 6:
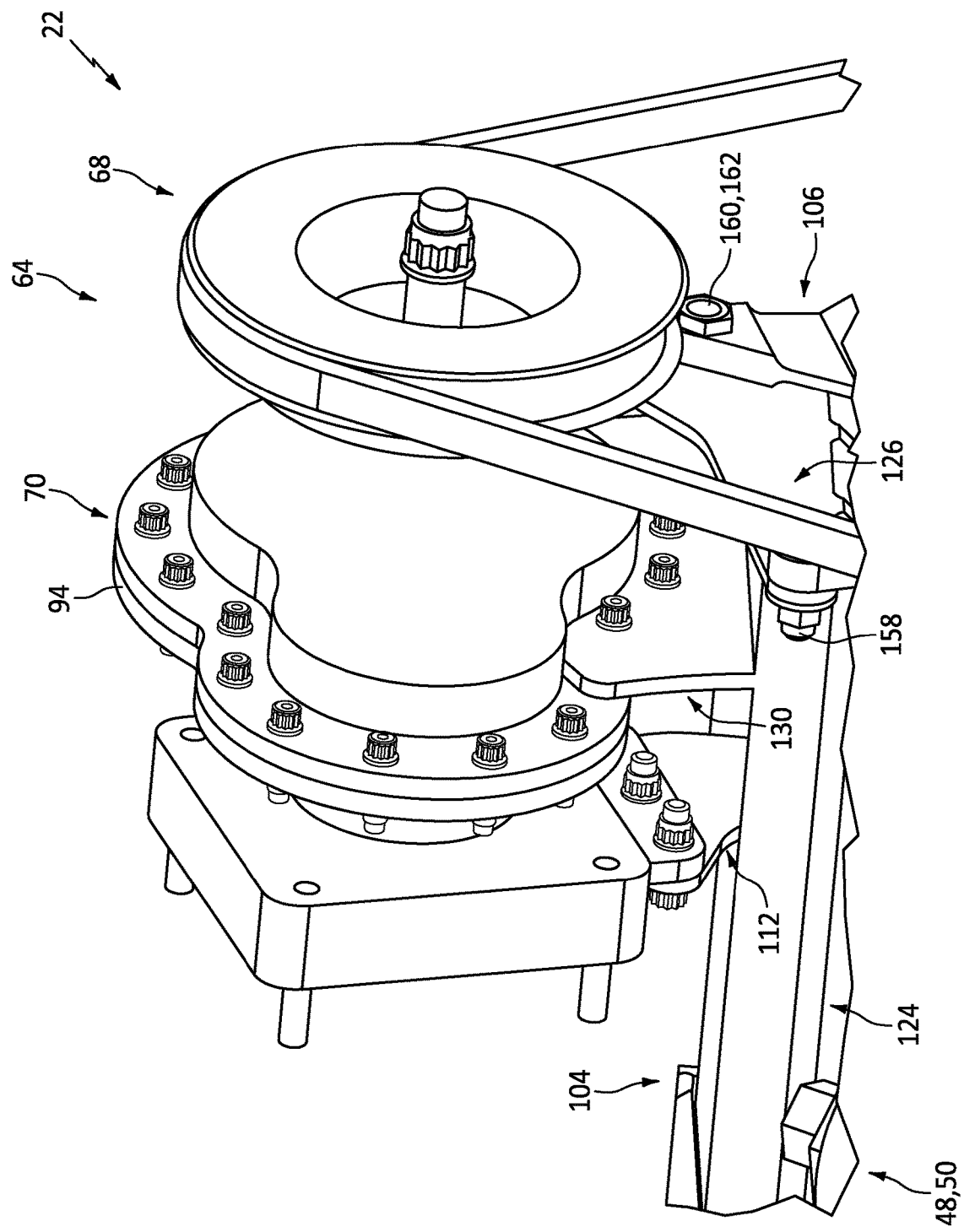

Referring to FIG. 2, the mechanical load 66 and the gearbox 70 are mounted to the mounting assembly 72. For example, referring to FIGS. 5 and 6, the gearbox 70 is fixedly coupled to the intermediate cradle mount 130 and the intermediate support 112. The gearbox 70 of FIGS. 5 and 6 and its gearbox case 94, for example, are mechanically fastened (e.g., bolted) or otherwise attached to the intermediate cradle mount 130 and the intermediate support 112. The electric generator 74 of FIG. 5 may be fixedly attached to the support cradle 104 through the gearbox 70. The electric generator 74 of FIG. 5 and its generator case 82, for example, are mechanically fastened (e.g., bolted) or otherwise attached to the gearbox 70 and its gearbox case 94. The electric generator 74 may thereby be cantilevered from the gearbox 70. However, it is contemplated the electric generator 74 and its generator case 82 may also or alternatively be attached (e.g., independent of the gearbox 70) to the support cradle 104.

Referring to FIG. 2, the forward mounting bracket 106, the aft mounting bracket 108 and the adjustment link 110 are each coupled to the engine housing 48 and its engine case 50. The forward mounting bracket 106 and the aft mounting bracket 108, more particularly, are fixedly coupled to the engine housing 48 and its engine case 50. The forward mounting bracket 106 of FIG. 2, for example, is mechanically fastened (e.g., bolted) or otherwise attached to a forward mount 194 (e.g., a forward flange, rim or boss) of (or on) the engine housing 48 and its engine case 50. The aft mounting bracket 108 of FIG. 2 is mechanically fastened (e.g., bolted) or otherwise attached to an aft mount 196 (e.g., an aft flange, rim or boss) of (or on) the engine housing 48 and its engine case 50. The adjustment link 110, by contrast, is pivotally coupled to the engine housing 48 and its engine case 50. More particularly, the first turnbuckle eye 178 of FIG. 2 is pivotally coupled to a link bracket 198 which is fixed to (or alternatively formed part of) the engine housing 48 and its engine case 50. For example, referring to FIG. 4, the first turnbuckle eye 178 is disposed between forks 200 and 202 (e.g., flanged, tabs, etc.) of a clevis of the link bracket 198. A fastener 204 (e.g., a bolt, a bolt and nut, a pin, etc.) projects sequentially through the first fork 200, the first turnbuckle eye 178 and the second fork 202.

With the arrangement of FIG. 2, the mounting assembly 72 is operable to adjust the tension of the tension member 88. For example, the turnbuckle body 182 of the adjustment link 110 may be turned a first direction to increase the length of the adjustment link 110 and tighten the tension of the tension member 88. Alternatively, the turnbuckle body 182 of the adjustment link 110 may be turned a second direction (opposite the first direction) to decrease the length of the adjustment link 110 and loosen the tension of the tension member 88. As the length of the adjustment link 110 is changed, a distance between the support cradle 104 and the engine housing 48 changes and the support cradle 104 and, thus, the attached components (e.g., 66, 70, 74) pivot about the pivot axis 114 (see FIG. 4). Increasing the length of the adjustment link 110 increases the distance between the support cradle 104 and the engine housing 48 such that the support cradle 104 and the attached components (e.g., 66, 70, 74) pivot outward and away from the engine housing 48. Decreasing the length of the adjustment link 110 decreases the distance between the support cradle 104 and the engine housing 48 such that the support cradle 104 and the attached components (e.g., 66, 70, 74) pivot inwards and towards from the engine housing 48. This pivoting movement is guided by the movement of the slides 162, 172 along the tracks 132, 142. However, following this adjustment, the fasteners 160, 170 may be tightened to maintain the set tension of the tension member 88.

In some embodiments, referring to FIG. 4, each of the mounting assembly components (e.g., 104, 106, 108, 112) may be formed as a discrete monolithic body. The term "monolithic" may describe a component that is cast, machined, additively manufactured and/or otherwise formed as a single, unitary body. The present disclosure, however, is not limited to such an exemplary construction.

The terms "forward" and "aft" are used herein to orientate the components of the engine system 64 described above relative to the gas turbine engine 20 and its axis 24. However, it is contemplated one or more of these components may alternatively be utilized in other orientations than those described above. The present disclosure therefore is not limited to the foregoing exemplary engine system spatial arrangement.

The engine system 64 may be configured with various gas turbine engines other than the one described above. The engine system 64, for example, may be configured with a turbofan engine, a turbojet engine, a turboprop engine, a turboshaft engine, a propfan engine, a pusher fan engine or any other type of gas turbine engine. The present disclosure therefore is not limited to any particular types or configurations of gas turbine engines. Moreover, while the belt drive 68 is described above as being coupled to the propulsor rotor 42 (e.g., the propeller rotor) of FIG. 1, it is contemplated the belt drive 68 may alternatively be coupled to various other turbine engine rotors, bladed or not.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a housing;
   a rotor next to the housing; and
   a system including a mechanical load, a belt drive, a cradle, a slide and an adjustment link;
   the mechanical load operatively coupled to the rotor through the belt drive, and the mechanical load fixed to the cradle;
   the cradle comprising a track and extending laterally between a first side and a second side, the cradle coupled to the housing through the adjustment link at the first side, and the cradle pivotally coupled to the housing at the second side;
   the slide connected to the housing, and the slide mated with and configured to move along the track; and
   the adjustment link configured to change a distance between the housing and the cradle to adjust a tension of the belt drive.

2. The assembly of claim 1, wherein the rotor comprises a propeller rotor.

3. The assembly of claim 1, wherein the mechanical load comprises a generator.

4. The assembly of claim 1, wherein
   the rotor is a first rotor;
   the mechanical load comprises a second rotor; and
   the first rotor is configured to drive rotation of the second rotor through the belt drive.

5. The assembly of claim 1, wherein
the system further includes a gearbox operatively coupled between the belt drive and the mechanical load; and
the gearbox is fixed to the cradle.

6. The assembly of claim 1, wherein the belt drive includes
a first pulley mounted to the rotor;
a second pulley operatively coupled to the mechanical load; and
a belt wrapped around and contacting the first pulley and the second pulley.

7. The assembly of claim 1, wherein the adjustment link comprises a turnbuckle.

8. The assembly of claim 1, wherein
the adjustment link is pivotally mounted to the housing; and
the adjustment link is pivotally mounted to the cradle.

9. The assembly of claim 1, wherein
the track comprises a slot in the cradle;
the slide comprises a fastener projecting through the slot; and
the fastener is configured to tighten against the cradle to fix a position of the cradle relative to the housing.

10. The assembly of claim 1, wherein
the track is a first track, and the cradle further comprises a second track;
the slide is a first slide, and the system further includes a second slide connected to the housing; and
the second slide is mated with and configured to move along the second track.

11. The assembly of claim 10, wherein the system further includes
a first bracket fixed to the housing, the cradle pivotally coupled to the first bracket at the second side, and the first slide connected to the first bracket; and
a second bracket discrete from the first bracket and fixed to the housing, the cradle pivotally coupled to the second bracket at the second side, and the second slide connected to the second bracket.

12. The assembly of claim 1, wherein
the system further includes a bracket mechanically fastened to a flange of the housing;
the cradle is pivotally coupled to the bracket at the second side; and
the slide is supported by the bracket.

13. The assembly of claim 1, wherein
the system further includes a support mechanically fastened to the cradle; and
the mechanical load is mechanically fastened to the support.

14. The assembly of claim 1, further comprising:
an engine core configured to drive rotation of the rotor; and
the engine core including a compressor section, a combustor section, a turbine section and a flowpath extending sequentially through the compressor section, the combustor section and the turbine section.

15. The assembly of claim 14, further comprising:
a geartrain operatively coupling the engine core to the rotor;
the geartrain housed within the housing.

16. An assembly for an aircraft propulsion system, comprising:
a housing;
a rotor next to the housing; and
a system including a mechanical load, a belt drive, a cradle, a first bracket, a second bracket and an adjustment link;
the mechanical load operatively coupled to the rotor through the belt drive, and the mechanical load supported by and fixed to the cradle;
the cradle extending longitudinally between a first end and a second end, the cradle extending laterally between a first side and a second side, the cradle coupled to the housing through the adjustment link at the first side, and the cradle pivotally coupled to the first bracket and the second bracket at the second side;
the first bracket disposed next to the first end and fixed to the housing independent of the second bracket;
the second bracket disposed next to the second end and fixed to the housing independent of the first bracket; and
the adjustment link configured to change a distance between the housing and the cradle to adjust a tension of the belt drive.

17. The assembly of claim 16, wherein
the first bracket is bolted to a first mount of the housing; and
the second bracket is bolted to a second mount of the housing.

18. The assembly of claim 16, wherein the cradle is disposed longitudinally between the first bracket and the second bracket.

19. The assembly of claim 16, wherein
the system further includes a first fastener and a second fastener;
the cradle comprises a first slot and a second slot;
the first fastener projects through the first slot and is configured to fix the cradle to the first bracket at the first side when the first fastener is tightened; and
the second fastener projects through the second slot and is configured to fix the cradle to the second bracket at the first side when the second fastener is tightened.

20. An assembly for an aircraft propulsion system, comprising:
a housing;
a rotor next to the housing; and
a system including a mechanical load, a belt drive, a cradle, a bracket and an adjustment link;
the mechanical load operatively coupled to the rotor through the belt drive, and the mechanical load supported by and fixed to the cradle;
the cradle extending laterally between a first side and a second side, the cradle pivotally coupled to the bracket at the second side;
the bracket fixed to the housing independent of the adjustment link; and
the adjustment link configured to change a distance between the housing and the cradle to adjust a tension of the belt drive, a first end of the adjustment link pivotally mounted to the cradle, and a second end of the adjustment link pivotally mounted to the housing.

* * * * *